US012508746B2

(12) United States Patent
Jeong et al.

(10) Patent No.: US 12,508,746 B2
(45) Date of Patent: Dec. 30, 2025

(54) FREEZE-DRYING MOLD AND METHOD FOR MANUFACTURING WATER-SOLUBLE POLYMER BALL USING SAME

(71) Applicant: GENEWEL CO., LTD., Seongnam-si (KR)

(72) Inventors: Man Geun Jeong, Seongnam-si (KR); Min Gyu Kim, Seongnam-si (KR)

(73) Assignee: Genewal Co., Ltd., Seongnamj-si (KR)

( * ) Notice: Subject to any disclaimer, the term of this patent is extended or adjusted under 35 U.S.C. 154(b) by 248 days.

(21) Appl. No.: 17/640,232

(22) PCT Filed: Sep. 4, 2020

(86) PCT No.: PCT/KR2020/011908
§ 371 (c)(1),
(2) Date: Mar. 3, 2022

(87) PCT Pub. No.: WO2021/049822
PCT Pub. Date: Mar. 18, 2021

(65) Prior Publication Data
US 2022/0314499 A1 Oct. 6, 2022

(30) Foreign Application Priority Data
Sep. 10, 2019 (KR) .......................... 10-2019-0111947

(51) Int. Cl.
*B29C 35/16* (2006.01)
*B29C 33/00* (2006.01)
(Continued)

(52) U.S. Cl.
CPC .......... *B29C 35/16* (2013.01); *B29C 33/0022* (2013.01); *B29C 33/40* (2013.01);
(Continued)

(58) Field of Classification Search
CPC ..... B29C 33/0022; B29C 33/40; B29C 33/42; B29C 35/16; B29C 39/00;
(Continued)

(56) References Cited

U.S. PATENT DOCUMENTS

| 2014/0165621 A1* | 6/2014 | Boarman | F25C 5/04 62/344 |
| 2018/0243219 A1* | 8/2018 | Ketterer | A61P 35/00 |

(Continued)

FOREIGN PATENT DOCUMENTS

CN 108478459 A * 9/2018 ............... A61K 8/42

*Primary Examiner* — Xiao S Zhao
*Assistant Examiner* — Victoria Bartlett
(74) *Attorney, Agent, or Firm* — Quarles & Brady LLP

(57) ABSTRACT

The present invention relates to a freeze-drying mold and a method for manufacturing water-soluble polymer balls using the same, more specifically to a freeze-drying mold that is provided with a first mold having a plurality of first accommodation grooves formed on underside thereof and a plurality of discharge portions formed on top thereof to communicate with the plurality of first accommodation grooves and a second mold having a plurality of second accommodation grooves formed on top thereof to be facingly coupled to the plurality of first accommodation grooves of the first mold to thus provide a plurality of accommodation portions, and a method for manufacturing water-soluble polymer balls using the same.

According to the present invention, the freeze-drying mold is capable of controlling the shrinkage rate of a solution in a freeze-drying process to make freeze-dried spherical materials, easily separating the made freeze-dried materials therefrom, and optimizing a drying efficiency thereof, and the method for manufacturing water-soluble polymer balls using the same is carried out so that the water-soluble (Continued)

polymer balls are constant in pore sizes and distributions, have high strength, and do not have any films on the surfaces thereof.

4 Claims, 6 Drawing Sheets

(51) Int. Cl.
| | | |
|---|---|---|
| B29C 33/40 | (2006.01) | |
| B29K 105/00 | (2006.01) | |
| B29L 31/54 | (2006.01) | |
| C08L 5/08 | (2006.01) | |

(52) U.S. Cl.
CPC ........ *C08L 5/08* (2013.01); *B29K 2105/0073* (2013.01); *B29K 2901/12* (2013.01); *B29K 2905/00* (2013.01); *B29L 2031/54* (2013.01); *C08L 2205/025* (2013.01); *C08L 2205/035* (2013.01)

(58) Field of Classification Search
CPC ......... C08L 2205/025; C08L 2205/035; C08L 5/08; C08K 5/00; B29K 2105/0073; B29K 2901/12; B29K 2905/00; B29L 2031/05
See application file for complete search history.

(56) References Cited

U.S. PATENT DOCUMENTS

| | | | |
|---|---|---|---|
| 2018/0279641 A1* | 10/2018 | Dong | A61Q 19/00 |
| 2019/0353415 A1* | 11/2019 | Henderson | F25C 5/14 |
| 2020/0038308 A1* | 2/2020 | Somerville | A61K 31/728 |
| 2020/0158404 A1* | 5/2020 | Kim | F25C 5/22 |

* cited by examiner

FREEZE-DRYING MOLD AND METHOD FOR MANUFACTURING WATER-SOLUBLE POLYMER BALL USING SAME

RELATED APPLICATIONS

This application is a 35 U.S.C. § 371 national phase application of PCT/KR2020/011908 (WO2021/049822), filed on Sep. 4, 2020, entitled "FREEZE-DRYING MOLD AND METHOD FOR MANUFACTURING WATER-SOLUBLE POLYMER BALL USING SAME", which application claims the benefit of Application No. 10-2019-0111947, filed Sep. 10, 2019 in the Republic of Korea which is incorporated herein by reference in its entirety.

TECHNICAL FIELD

The present invention relates to a freeze-drying mold and a method for manufacturing water-soluble polymer balls using the same, and more specifically, to a freeze-drying mold that is capable of controlling the shrinkage rate of a solution in a freeze-drying process to make freeze-dried spherical materials, easily separating the made freeze-dried materials therefrom, and optimizing a drying efficiency thereof, and a method for manufacturing water-soluble polymer balls using the same so that the water-soluble polymer balls are constant in pore sizes and distributions, have high strength, and do not have any films on the surfaces thereof.

BACKGROUND ART

Hyaluronic acid as one kind of water-soluble polymers is a biopolymer as a sugar molecule that comprises alternating N-acetyl-glucosamine and D-glucuronic acid connected in a linear form. Hyaluronic acid is first isolated from a liquid filled in an animal's eye (See Meyer K, et al., Journal of Biology and Chemistry 107 629-34 (1934)), and after that, it is much found in animal's placentas, synovial fluids of joints, pleural fluids, skin, cock's combs, and the like. Further, it is produced from *Streptococcus* bacteria such as *Streptococcus equi, Streptococcus zooepidemecus*, and the like.

Hyaluronic acid has excellent biocompatibility and high viscoelasticity at a state of a solution, and accordingly, it is widely used for cosmetic product purposes such as cosmetic additives as well as various medical purposes such as auxiliary agents for ophthalmic surgery, improving agents for joint functions, drug delivery materials, eye-drops, and the like. However, hyaluronic acid itself is easily dissolved in vivo or in acidic or alkaline conditions, which causes many limitations in the use thereof. Accordingly, many studies to develop hyaluronic acid derivatives that are structurally stable through hyaluronic acid cross-linking or functional groups coupled to hyaluronic acid have been made (See Laurent, T. C., et al., Portland Press Ltd., London, 1998).

Further, tries to deform the physicochemical and biological properties of hyaluronic acid have been made so as to apply hyaluronic acid to such various purposes as mentioned above, and to do this, hyaluronic acid is made to the shape of a hyaluronic acid sponge so that it is used for various purposes such as a support or carrier of a drug delivery system for cultivating and transplanting cells or tissues, a wound coating material, a dental material, a cosmetic material, and a medical material.

When hyaluronic acid is formed into hyaluronic acid sponges, however, the hyaluronic acid sponges may have different shrinkage rates in accordance with their position on a mold to thus make asymmetrically shaped products, and even after the manufacturing, the hyaluronic acid sponges are not separated well from the mold to thus cause a low collection rate, have many difficulties in manufacturing processes, exhibit low strength, and have thin films formed on surfaces thereof, which inhibit the physical properties or utilization of hyaluronic acid.

PRIOR ART

Patent Document (Patent Document 1): Korean Patent No. 2010-0079363

DISCLOSURE

Technical Problem

Accordingly, the present invention has been made in view of the above-mentioned problems occurring in the related art, and it is an object of the present invention to provide a freeze-drying mold that is capable of controlling the shrinkage rate of a solution in a freeze-drying process to make freeze-dried spherical materials, easily separating the made freeze-dried materials therefrom, and optimizing a drying efficiency thereof, and a method for manufacturing water-soluble polymer balls using the same so that the water-soluble polymer balls are constant in pore sizes and distributions, have high strength, and do not have any films on the surfaces thereof.

The above object and other objects of the present invention will be accomplished through the present invention as will be described below.

Technical Solution

To accomplish the above-mentioned objects, according to an aspect of the present invention, there is provided freeze-drying mold including: a first mold having a plurality of first accommodation grooves formed on underside thereof and a plurality of discharge portions formed on top thereof to communicate with the plurality of first accommodation grooves; and a second mold having a plurality of second accommodation grooves formed on top thereof to be facingly coupled to the plurality of first accommodation grooves of the first mold to thus provide a plurality of accommodation portions.

To accomplish the above-mentioned objects, according to another aspect of the present invention, there is provided a freeze-drying mold including: a first mold having a fitting portion steppedly protruding from the underside thereof, a plurality of first hemispherical accommodation grooves formed on the surface of the fitting portion in the form of a lattice, and a plurality of discharge portions formed on top thereof to communicate with the plurality of first accommodation grooves; and a second mold having a fitting recess concavedly formed on top thereof to be coupled to the fitting portion and a plurality of second hemispherical accommodation grooves formed on top thereof in the form of a lattice to be facingly coupled to the plurality of first accommodation grooves of the first mold to thus provide a plurality of spherical accommodation portions, wherein the first mold and the second mold have at least one or more fastening holes formed thereon correspondingly to one another and thus coupled to one another by means of fastening members.

To accomplish the above-mentioned objects, according to yet another aspect of the present invention, there is provided a method for manufacturing water-soluble polymer balls, including the steps of: coupling a first mold having a plurality of first accommodation grooves formed on underside thereof and a plurality of discharge portions formed on top thereof to communicate with the plurality of first accommodation grooves to a second mold having a plurality of second accommodation grooves formed on top thereof to be facingly coupled to the plurality of first accommodation grooves to thus provide a plurality of accommodation portions; freeze-drying a water-soluble polymer solution; and separating the first mold and the second mold from each other to collect the water-soluble polymer balls, wherein the water-soluble polymer solution is supplied to the second mold before the first mold and the second mold are coupled to each other or supplied to the accommodation portions through the discharge portions after the first mold and the second mold are coupled to each other.

Effective Advantages of the Invention

According to the present invention, the freeze-drying mold can control the shrinkage rate of the solution in the freeze-drying process to make the freeze-dried materials with desired shapes, particularly spherical shapes, easily separate the made freeze-dried materials therefrom, and optimize the drying efficiency thereof, and the method for manufacturing water-soluble polymer balls using the same is carried out so that the water-soluble polymer balls are constant in pore sizes and distributions, have high strength, and do not have any films on the surfaces thereof.

MODE FOR INVENTION

Figure 1:
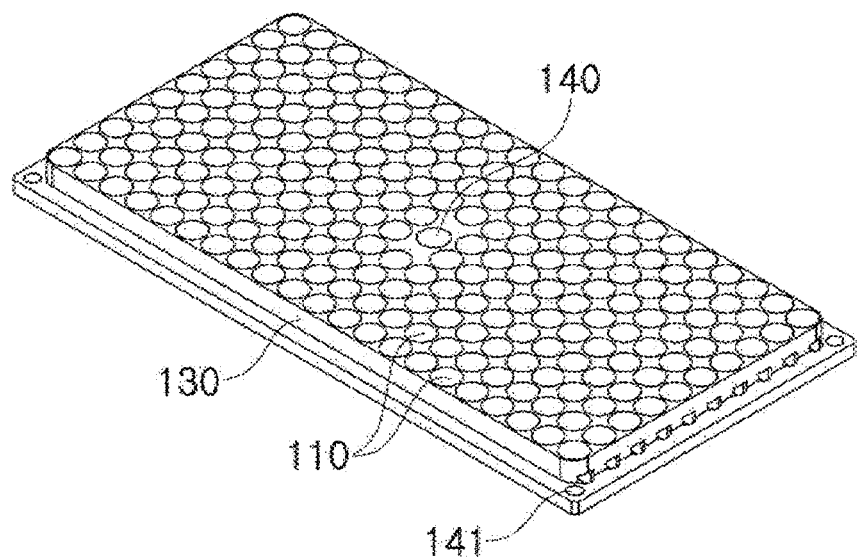
FIG. 1 is a perspective view showing a first mold according to the present invention.

Hereinafter, an explanation of a freeze-drying mold and a method for manufacturing water-soluble polymer balls using the same will be given in detail.

The inventors have found that with the use of a lower mold and an upper mold as a pair of male and female molds adjusted in configuration and thermal conductivity to given ranges, if a hyaluronic acid-based solution as a water-soluble polymer solution is freeze-dried, the shrinkage rate of the solution is controlled to manufacture freeze-dried materials with desired shapes, that is, with the same shape as mold cavities, and further, the made freeze-dried materials are constant in pore sizes and distributions, have high strength, and do not have any films on the surfaces thereof. The present invention has been accomplished through many studies based on the results.

According to the present invention, a freeze-drying mold includes: a first mold having a plurality of first accommodation grooves formed on underside thereof and a plurality of discharge portions formed on top thereof to communicate with the plurality of accommodation grooves; and a second mold having a plurality of second accommodation grooves formed on top thereof to be facingly coupled to the plurality of first accommodation grooves of the first mold to thus provide a plurality of accommodation portions. In this case, advantageously, freeze-dried materials with desired shapes may be made easily and rapidly.

For example, each first accommodation groove and each second accommodation groove may have hemispherical shapes, and through their coupling, each accommodation portion may have a spherical shape. In this case, the freeze-dried materials may be handled and utilized easily.

The accommodation portion may have a diameter of 5 to 30 mm, preferably 5 to 25 mm, more preferably 10 to 20 mm, most preferably 10 to 15 mm, and within the range, it is easy to handle the freeze-dried materials and utilize them as cosmetic materials.

The first accommodation grooves and the second accommodation grooves are desirably arranged in the form of a lattice, respectively, and in this case, the freeze-dried materials may be easily handled and made with high productivity.

For example, desirably, the first mold has a fitting portion steppedly protruding from the underside thereof, and the first accommodation grooves are formed on the surface of the fitting portion. The second mold has a fitting recess formed on the top thereof to be fittingly coupled to the fitting portion of the first mold, and the second accommodation grooves are formed inside the fitting recess. In this case, a freeze-drying process is easy, and after that, the freeze-dried materials are easily handled.

The empty space occupied by the fitting recess is greater than or equal to the empty space occupied by the first accommodation grooves, and preferably, the empty space occupied by the fitting recess is one to two times as large as that occupied by the first accommodation grooves. Within the range, the freeze-drying process is easy, a loss of a subject solution is small, and the freeze-dried materials with desired shapes are produced.

For another example, the depth of the fitting recess is equal to the depth of each first accommodation groove or greater by one to two times than the depth of each first accommodation groove, and over the depth of each first accommodation groove, in specific, the fitting recess has a depth in the range of 2.5 to 15 mm, preferably 5 to 12.5 mm, more preferably 7.5 to 10 mm. Within the range, the freeze-drying process is easy, a loss of a subject solution is small, and the freeze-dried materials with desired shapes are produced.

The first mold and the second mold desirably have at least one or more fastening holes formed thereon correspondingly to one another and coupled to one another by means of fastening members, and more desirably, they have one to five fastening holes. In this case, the freeze-drying process is safely carried out, and after that, the freeze-dried materials are easily handled.

Desirably, the first mold has a lower thermal conductivity than the second mold, and when a reference temperature is 20° C., the first mold has a lower thermal conductivity by 100 W/mK, preferably 150 W/mK, more preferably 200 W/mK, most preferably 250 W/mK than the second mold, and within the range, the shrinkage rate of a freeze-drying subject solution in the freeze-drying process is controlled to thus make the freeze-dried materials with desired shapes, that is, with the same shapes as mold cavities.

According to the present invention, only if the thermal conductivity is measured through a thermal conductivity measuring method typically used in the technical field related to the present invention, it may be limited particularly thereto, and for example, the thermal conductivity may be measured in a non-contact method through ASTME1461. In the case of the non-contact method, thermal diffusivity $\alpha$, specific heat Cp, and density $\rho$ are measured, and they are converted to thermal conductivity $\lambda$. In this case, the thermal conductivity may be considered in accordance with directions of thickness y and horizontal level x, and the measurement is in the range of 0.1 to 2000 W/m·K.

The first mold may include, for example, a thermoplastic resin, preferably one or more resins selected from the group consisting of a polyacetal resin and a polyolefin resin, more preferably a polyacetal resin or a polypropylene resin, and in this case, in the freeze-drying process, a drying efficiency is excellent, and the shrinkage rate of the subject solution is controlled to make the freeze-dried spherical materials. Further, the made freeze-dried materials are easily separated from the mold to optimize a collection rate thereof, and the freeze-dried materials are constant in pore sizes and distributions, have high strength, and do not have any films on the surfaces thereof.

On the conditions of 1 atm pressure and 293 K, for example, the thermoplastic resin has a thermal conductivity less than or equal to 100 W/mK, preferably 50 W/mk, more preferably 10 W/mK, much more preferably 1 W/mK, most preferably in the range of 0.01 to 1 W/mK, and within the range, the shrinkage rate of the freeze-drying subject solution in the freeze-drying process is controlled to thus make the freeze-dried materials with desired shapes, that is, with the same shapes as mold cavities, while the drying efficiency is being optimized.

The second mold may include preferably a metal, more preferably one or more metals selected from the group consisting of aluminum, duralumin, tungsten, iron, cast iron, carbon steel, stainless steel, copper, bronze, brass, lead, nickel, gold, and silver, most preferably aluminum, and in this case, in the freeze-drying process, a drying efficiency is excellent, and the shrinkage rate of the subject solution is controlled to make the freeze-dried spherical materials. Further, the made freeze-dried materials are easily separated from the mold to optimize a collection rate thereof, and the freeze-dried materials are constant in pore sizes and distributions, have high strength, and do not have any films on the surfaces thereof.

On the conditions of 1 atm pressure and 293 K, for example, the metal has a thermal conductivity greater than or equal to 200 W/mK, preferably 210 W/mk, more preferably 220 W/mK, much more preferably 225 W/mK, most preferably in the range of 225 to 250 W/mK, and within the range, the shrinkage rate of the freeze-drying subject solution in the freeze-drying process is controlled to thus make the freeze-dried materials with desired shapes, that is, with the same shapes as mold cavities, while the drying efficiency is being optimized.

The surface of the second mold may be subjected to, for example, anodizing, preferably hard anodizing, and in this case, the freeze-dried materials are easily separated from the mold to optimize the collection rate thereof and do not have any films on the surfaces thereof.

Desirably, the anodized surface of the second mold is subjected to either sealing or coloring or both of them, and more desirably, the surface of the second mold is sealed with white pigment. In this case, the freeze-dried materials are easily separated from the mold to optimize the collection rate thereof and do not have any films on the surfaces thereof.

According to the present invention, anodizing is an electrochemical process that converts a metal surface into alumina, and only if the anodizing is conducted typically in the technical field related to the present invention, it may be limited particularly.

According to the present invention, sealing is a process that makes the film formed on the metal surface smoothened after the anodizing, and only if the sealing is conducted typically in the technical field related to the present invention, it may be limited particularly.

According to the present invention, coloring is a process that adds a pigment during the sealing to obtain gloss and good appearance, and only if the sealing is conducted typically in the technical field related to the present invention, it may be limited particularly.

The top of the second mold is coated with one or more resins selected from the group consisting of a fluoropolymer and a polyolefin resin, and in this case, the freeze-dried materials are easily separated from the mold to optimize the collection rate thereof and do not have any films on the surfaces thereof.

The fluoropolymer comprises one or more polymers selected from the group consisting of polytetrafluoroethylene (PTFE), polychlorotrifluoroethylene (PCTFE), polyvinylidene fluoride (PVDF), polyvinyl fluoride (PVF), perfluoroalkoxy (PFA), fluorinated ethylene copolymer propylene (FEP), ethylene tetrafluoroethylene (ETFE), and ethylene chlorotrifluoroethylene (ECTFE), and in this case, the freeze-dried materials are easily separated from the mold to optimize the collection rate thereof and do not have any films on the surfaces thereof.

According to the present invention, only if the coating is conducted by wet or dry coating used typically in the technical field related to the present invention, it may be limited particularly, and desirably, the dry coating wherein the fluoropolymer powder is coated directly on the substrate surface through heat or plasma may be adopted.

The polyolefin resin is, for example, polypropylene, polyethylene, or a combination thereof, and in this case, the freeze-dried materials are easily separated from the mold to optimize the collection rate thereof and do not have any films on the surfaces thereof.

According to the present invention, the freeze-drying mold includes: the first mold having the fitting portion steppedly protruding from the underside thereof, the plurality of first hemispherical accommodation grooves formed on the surface of the fitting portion in the form of the lattice, and the plurality of discharge portions formed on top thereof to communicate with the plurality of first accommodation grooves; and the second mold having the fitting recess concavedly formed on top thereof to be coupled to the fitting portion and the plurality of second hemispherical accommodation grooves formed on top thereof in the form of the lattice to be facingly coupled to the plurality of first accommodation grooves of the first mold to thus provide the plurality of spherical accommodation portions, wherein the first mold and the second mold have at least one or more fastening holes formed thereon correspondingly to one another and thus coupled to one another by means of fastening members. In this case, in the freeze-drying process of a water-soluble polymer solution, the shrinkage rate of the solution is controlled to make the freeze-dried spherical materials, and further, the made freeze-dried materials are easily separated from the mold to optimize a collection rate thereof. The freeze-drying efficiency is optimized, and the freeze-dried materials are constant in pore sizes and distributions, while having high strength.

The freeze-drying mold is desirably a freeze-drying mold for a water-soluble polymer.

A method for manufacturing water-soluble polymer balls according to the present invention includes the steps of: coupling a first mold having a plurality of first accommodation grooves formed on underside thereof and a plurality of discharge portions formed on top thereof to communicate with the plurality of first accommodation grooves to a second mold having a plurality of second accommodation grooves formed on top thereof to be facingly coupled to the plurality of first accommodation grooves of the first mold to thus provide a plurality of accommodation portions; freeze-drying a water-soluble polymer solution; and separating the first mold and the second mold from each other to collect the water-soluble polymer balls, wherein the water-soluble polymer solution is supplied to the second mold before the first mold and the second mold are coupled to each other or supplied to the accommodation portions through the discharge portions after the first mold and the second mold are coupled to each other, and the first mold has a lower thermal conductivity than the second mold. In this case, in the freeze-drying process of the water-soluble polymer solution, the shrinkage rate of the solution is controlled to make the freeze-dried spherical materials, and further, the made freeze-dried materials are easily separated from the mold to optimize a collection rate thereof. The freeze-drying efficiency is optimized, and the freeze-dried materials are constant in pore sizes and distributions, while having high strength.

Desirably, a method for manufacturing water-soluble polymer balls according to the present invention includes the steps of: A) preparing a first mold having a plurality of first accommodation grooves formed on underside thereof and a plurality of discharge portions formed on top thereof to communicate with the plurality of first accommodation grooves and a second mold having a plurality of second accommodation grooves formed on top thereof to be facingly coupled to the plurality of first accommodation grooves of the first mold to thus provide a plurality of accommodation portions; B) supplying a water-soluble polymer solution to the second mold and coupling the second mold to the first mold; C) freeze-drying the supplied water-soluble polymer solution; and D) separating the first mold and the second mold from each other to collect the water-soluble polymer balls, wherein the first mold has a lower thermal conductivity than the second mold. In this case, in the freeze-drying process of the water-soluble polymer solution, the shrinkage rate of the solution is controlled to make the freeze-dried spherical materials, and further, the made freeze-dried materials are easily separated from the mold to optimize a collection rate thereof. The freeze-drying efficiency is optimized, and the freeze-dried materials are constant in pore sizes and distributions, while having high strength.

Desirably, the first mold desirably has a fitting portion steppedly protruding from the underside thereof, the plurality of first hemispherical accommodation grooves formed on the surface of the fitting portion in the form of a lattice, and the plurality of discharge portions formed on top thereof to communicate with the plurality of first accommodation grooves.

Desirably, the second mold has a fitting recess concavedly formed on top thereof to be coupled to the fitting portion of the first mold and the plurality of second hemispherical accommodation grooves formed on top thereof in the form of a lattice to be facingly coupled to the plurality of first accommodation grooves of the first mold to thus provide the plurality of spherical accommodation portions.

The freeze-drying subject solution is filled even into the fitting recess of the second mold, and next, if the first mold is coupled to top of the second mold, the freeze-drying subject solution is naturally filled even into the first accommodation grooves of the first mold. After the filling, the remaining freeze-drying subject solution on the first accommodation grooves is discharged through the discharge portions. Further, even when the freeze-drying subject solution is expanded or water is generated in the freeze-drying process, the expanded solution or water may be discharged or removed through the discharge portions, thereby making the freeze-drying process easy and obtaining the freeze-dried materials with desired shapes.

Desirably, the first mold and the second mold have at least one or more fastening holes formed thereon correspondingly to one another and thus coupled to one another by means of fastening members.

For example, a method for manufacturing water-soluble polymer balls according to the present invention includes the steps of: a) coupling a first mold having a plurality of first accommodation grooves formed on underside thereof and a plurality of discharge portions formed on top thereof to communicate with the plurality of first accommodation grooves to a second mold having a plurality of second accommodation grooves formed on top thereof to be facingly coupled to the plurality of first accommodation grooves of the first mold to thus provide a plurality of accommodation portions; b) supplying a water-soluble polymer solution to the plurality of accommodation portions through the plurality of discharge portions; c) freeze-drying the water-soluble polymer solution supplied to the plurality of accommodation portions; and d) separating the first mold and the second mold from each other to collect the water-soluble polymer balls. In this case, in the freeze-drying process of the water-soluble polymer solution, the shrinkage rate of the solution is controlled to make the freeze-dried spherical materials, and further, the made freeze-dried materials are easily separated from the mold to optimize a collection rate thereof. Further, the freeze-drying efficiency is optimized, and the freeze-dried materials are constant in pore sizes and distributions, while having high strength.

The water-soluble polymer is for example a natural water-soluble polymer or a natural polymer with biocompatibility, preferably hyaluronic acid or hyaluronic acid salt.

The water-soluble polymer solution is for example a water-soluble polymer aqueous solution.

Desirably, the water-soluble polymer solution is a hyaluronic acid-based solution comprising a hyaluronic acid-based compound and a hydrophilic polymer.

In the method for manufacturing the water-soluble polymer balls according to the present invention, the collection rate is greater than or equal to 90%, preferably 91%, more preferably 93%, most preferably 95%, and within the range, excellent economical advantages can be obtained.

According to the present invention, the hyaluronic acid-based compound comprises hyaluronic acid, hyaluronic acid salt, and a derivative thereof, and of course, hyaluronic acid and hyaluronic acid salt are just separated in kind. Accordingly, they may be mixed with each other.

According to the present invention, desirably, the hyaluronic acid-based solution comprises: 100 parts by weight of a base polymer comprising A) 44 to 93% by weight of hyaluronic acid or hyaluronic acid salt having the average molecular weight less than 100,000 Daltons, B-1) 0.5 to 12% by weight of hyaluronic acid or hyaluronic acid salt having the average molecular weight in the range of 100,000 to 1,000,000 Daltons, B-2) 0.1 to 5% by weight of hyaluronic acid or hyaluronic acid salt having the average molecular weight greater than 1,000,000 Daltons, and C) 1 to 50% by weight of a hydrophilic polymer; and 0 to 25% by weight of active ingredients. The hyaluronic acid salt comprises one or more materials selected from the group consisting of sodium hyaluronate, potassium hyaluronate, calcium hyaluronate, magnesium hyaluronate, zinc hyaluronate, cobalt hyaluronate, and tetrabutylammonium hyaluronate, and the hydrophilic polymer comprises one or more materials selected from the group consisting of maltodextrin, dextrin, guar gum, xanthan gum, Arabic cum, carboxymethylcellulose, agar, beta-glucan, pullulan, collagen, algin, cross-linked hyaluronic acid salt, cross-linked hyaluronic acid, chitosan, heparin, gelatin, elastin, hydrolyzed elastin, fibrin, laminin, fibronectin, proteoglycan, heparin sulfate, chondroitin sulfate, dematan sulfate, and keratan sulfate, and the active ingredients comprise one or more materials selected from the group consisting of cetearyl olivate, ethylhexyl olivate, hydroxypropyltrimonium hyaluronic acid, sodium caprooyl hyaluronate, sodium oleoyl hyaluronate, sodium acetylated hyaluronate, arbutin, *Broussonetia* extract, Licorice extract, *Euphorbiae lathyridis* seed extract, *Atractylodes macrocephala* extract, ethyl ascorbyl ether, ascorbyl glucoside, niacinamide, magnesium ascorbyl phosphate, ascorbic acid and a derivative thereof, kojic acid, glutathione, tyrosinase, diosmetin, macelignan, vitamins and derivatives thereof, asiaticoside, ubidecarenone, Peony extract, polyethoxylated retinamide, hydroxyproline, retinoic acid and a derivative thereof, alpha hydroxyl acid (AHA), adenosine, botox and a derivative thereof, and an extract of rosemary, cloves, *Thujae orientalis* semen, *Curcuma longa* root, green tea, black soybean seed coat, rose leaves, *Paeonia lactiflora* pallas, *Platycodon grandiflours*, bean sprouts, colored barley seed coat, *Camellia* leaves, buckwheat, grapefruit, licorice, *Coptis chinensis*, *Phellodendron* bark, Bikal skullcap, cinnamon, grass, *Rubus coreanus* miquel, *Galla rhois, Juniperus chinensis, Forsythia*, chili leaves, mint, mock strawberry, *Morus alba, Saururus chinensis*, pine tree, wormwood, *Houttuynia cordata, Prunus yedoensis Matsumura, Sasa borealis* Makin, or *Phyllostachys bambusoides* stem. The range is advantageous to the freeze-drying mold of the present invention, and even though the hyaluronic acid-based compound with low molecular weight, which fails to ensure mechanical strength in conventional practices, is used, high mechanical strength is provided. As a result, there is provided a hyaluronic acid-based solution that has short dissolution time through the low molecular weight of the hyaluronic acid-based compound, has small stickiness to thus provide excellent use feeling, and is well-dried.

Desirably, the hyaluronic acid-based solution comprises: 100 parts by weight of a base polymer comprising A) 45 to 65% by weight of hyaluronic acid or hyaluronic acid salt having the average molecular weight less than 100,000 Daltons, B-1) 1 to 15% by weight of hyaluronic acid or hyaluronic acid salt having the average molecular weight in the range of 100,000 to 1,000,000 Daltons, B-2) 0.5 to 2% by weight of hyaluronic acid or hyaluronic acid salt having the average molecular weight greater than 1,000,000 Daltons, and C) 20 to 50% by weight of a hydrophilic polymer; and 0.1 to 25% by weight of active ingredients. The range is advantageous to the freeze-drying mold of the present invention, and high mechanical strength is provided. Further, dissolution time is short through the low molecular weight, and stickiness is small to provide excellent use feeling.

The hyaluronic acid salt is desirably sodium hyaluronate, and in this case, it is effective in skin care and wound treatment.

According to the present invention, Dalton is defined as 1/12 of the mass of a neutral atom of carbon-12.

According to the present invention, the average molecular weight is obtained by calculating values produced by multiplying peak areas by molecular weights of peaks of hyaluronic acid and/or hyaluronic acid salt measured by a GPC technique, adding the calculated values to every peak, and dividing the added value into the entire peak area.

For example, the water-soluble polymer solution comprises water in the range of from 10 times to 1,000 times of the total weight of a water-soluble polymer, preferably in the range of from 20 times to 500 times, more preferably in the range of from 30 times to 200 times, still more preferably in the range of from 40 times to 100 times, most preferably in the range of from 40 times to 80 times. Within the range, the freeze-drying collection rate is enhanced.

For example, the hyaluronic acid-based solution comprises water in the range of from 10 times to 1,000 times of the total weight of the hyaluronic acid or hyaluronic acid salt, preferably in the range of from 20 times to 500 times, more preferably in the range of from 30 times to 200 times, still more preferably in the range of from 40 times to 100 times, most preferably in the range of from 40 times to 80 times. Within the range, the freeze-drying collection rate is enhanced.

The water is replaced with less than 20% by weight, preferably less than or equal to 10% by weight, more preferably less than or equal to 5% by weight organic solvent with respect to the total weight thereof. In specific, the water is replaced with the organic solvent preferably in the range of 1 to 20% by weight, more preferably in the range of 1 to 10% by weight, most preferably in the range of 1 to 5% by weight. Within the range, the desired shapes are made well, the drying efficiency is good, and the freeze-drying collection rate is enhanced.

The organic solvent is desirably at least one or more kinds selected from the group consisting of alcohol, and more desirably, the organic solvent is ethanol.

For example, each water-soluble polymer ball has a diameter in the range of 3 to 25 mm, preferably in the range of 5 to 20 mm, more preferably in the range of 8 to 15 mm, most preferably in the range of 10 to 12 mm, and within the range, the ball may be handled easily and greatly utilized as a cosmetic material.

For example, each water-soluble polymer ball has compressive strength (mean, N) greater than or equal to 1, preferably greater than or equal to 2, most preferably greater than or equal to 2.2. In specific, each water-soluble polymer ball has compressive strength in the range of 1 to 5, preferably in the range of 1.5 to 4, more preferably in the range of 2 to 3, and within the range, the ball may be handled easily and greatly utilized as a cosmetic material.

For example, each water-soluble polymer ball has, for example, melting time (seconds) less than 20 seconds, preferably less than or equal to 19 seconds, more preferably less than or equal to 18 seconds, and most preferably less than 18 seconds, and within the range, the ball may be handled easily and greatly utilized as a cosmetic material.

The freezing step includes: a first freezing step of freezing the water-soluble polymer solution at an atmospheric pressure and a temperature in the range of −1 to −10° C. for 10 to 60 minutes; a second freezing step of reducing the water-soluble polymer solution after the first freezing step to a temperature in the range of −40 to −60° C. at the atmospheric pressure for 1 to 10 hours; and a third freezing step of keeping the water-soluble polymer solution after the second freezing step to a temperature in the range of −40 to −60° C. at the atmospheric pressure for 30 minutes to 5 hours. Within the range, the freezing efficiency is good, and the mechanical strength of the dried water-soluble polymer is excellent. Further, dissolution time is short, and stickiness is small to provide excellent use feeling.

In the description, the atmospheric pressure is a pressure to which no decreasing or increasing occurs, and generally, the atmospheric pressure is referred to as one atmosphere, for example, a pressure in the range of 1 bar±300 Pa.

According to the present invention, desirably, the freezing step includes: a first freezing step of freezing the water-soluble polymer solution at an atmospheric pressure and a temperature in the range of −3 to −8° C. for 20 to 40 minutes; a second freezing step of reducing the water-soluble polymer solution after the first freezing step to a temperature in the range of −40 to −50° C. at the atmospheric pressure for 5 to 9 hours; and a third freezing step of keeping the water-soluble polymer solution after the second freezing step to a temperature in the range of −40 to −50° C. at the atmospheric pressure for 1 to 3 hours. Within the range, the freezing efficiency is good, and the mechanical strength of the dried water-soluble polymer is excellent. Further, dissolution time is short, and stickiness is small to provide excellent use feeling.

According to the present invention, desirably, the drying step includes: a first drying step of step by step or sequentially raising the frozen water-soluble polymer solution at a pressure in the range of 100 to 1,000 µbar to a temperature in the range of 10 to 40° C. for 5 to 30 hours; and a second drying step of drying the water-soluble polymer solution after the first drying step at a pressure in the range of 1 to 99 µbar and a temperature in the range of 20 to 50° C. for 1 to 20 hours. Within the range, the freezing efficiency is good, and the mechanical strength of the dried water-soluble polymer is excellent. Further, dissolution time is short, and stickiness is small to provide excellent use feeling.

According to an embodiment of the present invention, desirably, the drying step includes: sequentially keeping the frozen water-soluble polymer solution at a pressure in the range of 100 to 1,000 µbar and a temperature less than −40° C. to less than or equal to −10° C. for 2 to 6 hours; keeping the frozen water-soluble polymer solution at a temperature greater than −10° C. to less than or equal to −5° C. for 2 to 6 hours; keeping the frozen water-soluble polymer solution at a temperature greater than −5° C. to less than or equal to 0° C. for 2 to 6 hours; keeping the frozen water-soluble polymer solution at a temperature greater than 0° C. to less than or equal to 10° C. for 30 minutes to 2 hours; keeping the frozen water-soluble polymer solution at a temperature greater than 10° C. to less than or equal to 20° C. for 30 minutes to 2 hours; keeping the frozen water-soluble polymer solution at a temperature greater than 20° C. to less than or equal to 30° C. for 30 minutes to 2 hours; and keeping the frozen water-soluble polymer solution at a temperature greater than 30° C. to less than or equal to 45° C. for 30 minutes to 2 hours. Within the range, the freezing efficiency is good, and the mechanical strength of the dried water-soluble polymer is excellent. Further, dissolution time is short, and stickiness is small to provide excellent use feeling.

A method for manufacturing the water-soluble polymer solution may include heating, agitating, and distributing steps before the freezing step if necessary.

The heating and agitating steps are carried out, for example, at a temperature in the range of 5 to 50° C., preferably at a temperature in the range of 10 to 25° C.

Further, the method for manufacturing the water-soluble polymer solution may include a filtering step, a sterilizing step, or both of the filtering and sterilizing steps, selectively, after the distributing step.

The filtering step is carried out through a microfilter with a pore diameter in the range of 0.1 to 5 µm, preferably with a pore diameter in the range of 0.3 to 1 µm, more preferably with a pore diameter in the range of 0.5 to 0.8 µm.

In the description, the pore diameter is based on the definition generally admitted in the technical field of the microfilter, and further, the pore diameter may have the size described on a microfilter product currently sold on the market.

The filtering and sterilizing steps are carried out, for example, at a temperature in the range of 20 to 25° C. and a maximum pressure of 5 bar, preferably at a temperature in the range of 20 to 25° C. and a maximum pressure in the range of 1.5 to 3 bar, more preferably at a temperature in the range of 20 to 25° C. and a maximum pressure in the range of 2 to 3 bar.

A device used for the freeze-drying according to the present invention is a typically available device in the technical field related to the present invention, and only if the device satisfies the temperature and pressure conditions as suggested in the present invention, it may not be specially limited. For example, a separable freeze-drying device with a freezer and a vacuum drier separated from each other may be used as the device, and otherwise an integral type freeze-drying device with a freezer, a vacuum device, and a heater coupled to one another may be used as the device.

Hereinafter, a freeze-drying mold according to an embodiment of the present invention will be explained in detail with reference to the attached drawings, but since the freeze-drying mold is just exemplary, it may not limit the technical range of the present invention.

FIG. 1 is a perspective view showing a first mold 100 according to the present invention, and the first mold 100 has a fitting portion 130 steppedly protruding from the underside thereof and a plurality of first hemispherical accommodation grooves 110 formed on the surface of the fitting portion 130 in the form of a lattice. Further, the first mold 100 has a first fastening hole 140 formed at the center thereof and second fastening holes 141 formed on the corners of outer edges of the fitting portion 130 so that the first mold 100 can be fixed to a second mold 200 when it is fittedly coupled to the second mold 200 to provide the freeze-drying mold. The fastening holes are fixed to one another by means of fastening members such as bolts, nuts, fixing pins, and the like.

Even though not shown, the first mold 100 has a length of 300 mm in the range of about 280 to 320 mm, a width of 150 mm in the range of about 130 to 170 mm, and a height of 16 mm in the range of about 12 to 18 mm, and each first accommodation groove 110 has a radius, that is, a depth of 8 mm in the range of about 6 to 10 mm. Within the ranges, the freeze-drying process is easy, the freeze-drying efficiency is excellent, and the freeze-dried materials are easily handled.

Further, the first mold 100 is made of a polyacetal (or POM) resin having a low thermal conductivity, and even if separate coating is not applied to the underside of the first mold 100, the shrinkage rate of the solution in the freeze-drying process is easily controlled to easily make the freeze-dried spherical materials. Further, the made freeze-dried materials are easily separated from the mold to optimize a collection rate thereof, and the freeze-dried materials are constant in pore sizes and distributions, have high strength, and do not have any films on the surfaces thereof.

Figure 2:
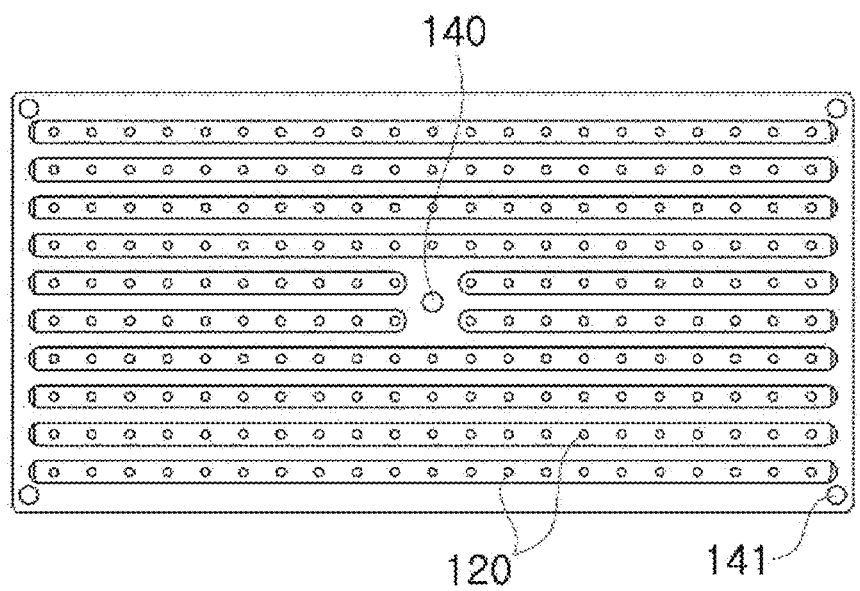
FIG. 2 is a top view showing the first mold according to the present invention.

FIG. 2 is a top view showing the first mold 100 according to the present invention, wherein the first mold 100 as shown in FIG. 1 is turned over so that a plurality of discharge portions 120 communicating with the first accommodation grooves 110 are formed. When the first mold 100 is coupled to top of the second mold 200 filled with a water-soluble polymer solution, the water-soluble polymer solution exceeding the volumes of accommodation portions 11 is discharged through the discharge portions 120, and further, even when the water-soluble polymer solution is expanded or contracted in the freeze-drying process, an extra or lack of the water-soluble polymer solution is discharged or filled through the discharge portions 120. Also, vaporized water may be discharged through the discharge portions 120. After the first mold 100 and the second mold 200 have been coupled to each other, as another example, a solution to be freeze-dried such as the water-soluble polymer solution is put into the accommodation portions 11 formed when the first mold 100 and the second mold 200 are coupled to each other, through the discharge portions 120.

Figure 3:
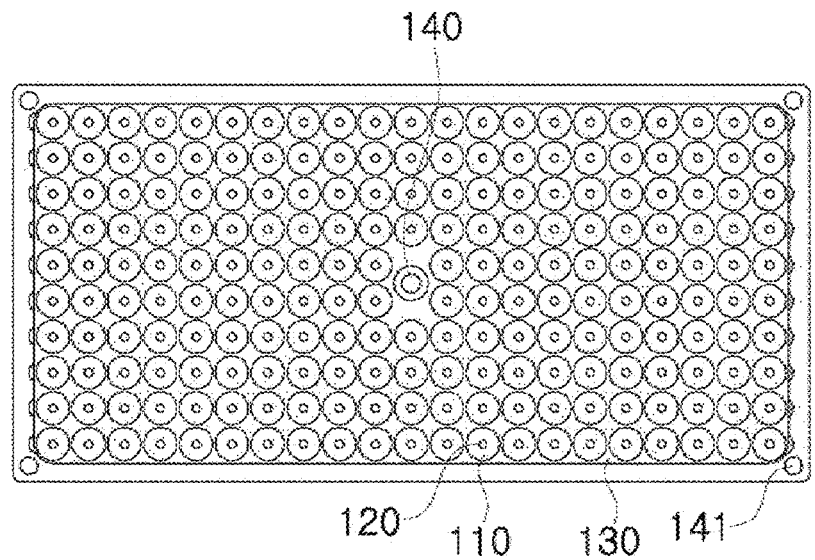
FIG. 3 is a bottom view showing the first mold according to the present invention.

FIG. 3 is a bottom view showing the first mold 100 according to the present invention, and the first mold 100 has the fitting portion 130 steppedly protruding from the underside thereof, the plurality of first hemispherical accommodation grooves 110 formed on the surface of the fitting portion 130 in the form of a lattice, and the plurality of discharge portions 120 communicating with the bottoms of the first accommodation grooves 110. So as to fix the freeze-drying mold 10, further, the first mold 100 has the first fastening hole 140 formed at the center thereof and the second fastening holes 141 formed on the corners of outer edges of the fitting portion 130.

Figure 4:
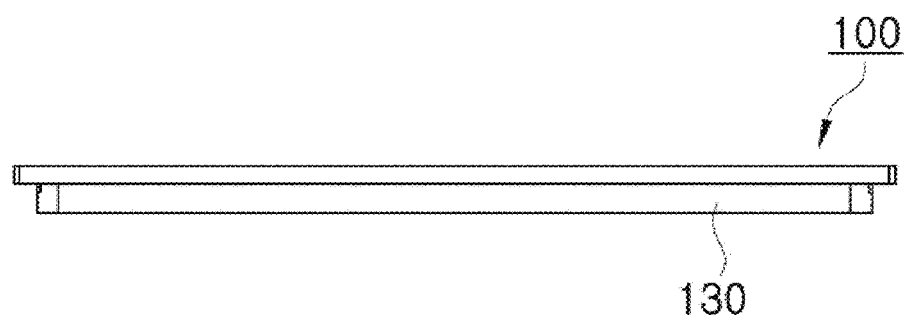
FIG. 4 is a side view showing the first mold according to the present invention.

FIG. 4 is a side view showing the first mold 100 according to the present invention, and the first mold 100 has the fitting portion 130 steppedly protruding from the underside thereof, on which the plurality of first hemispherical accommodation grooves 110 are formed.

Figure 5:
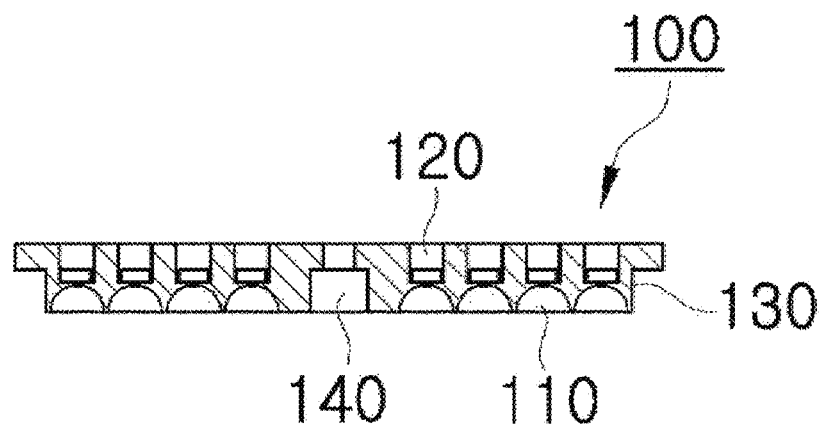
FIG. 5 is a sectional view showing the first mold according to the present invention.

FIG. 5 is a sectional view showing the first mold 100 according to the present invention, and the first mold 100 has the first hemispherical accommodation grooves 110 formed at the inside thereof, the discharge portions 120 for discharging an extra amount of the solution to be freeze-dried, and the first fastening hole 140 for fixing the freeze-drying mold 10.

Figure 6:
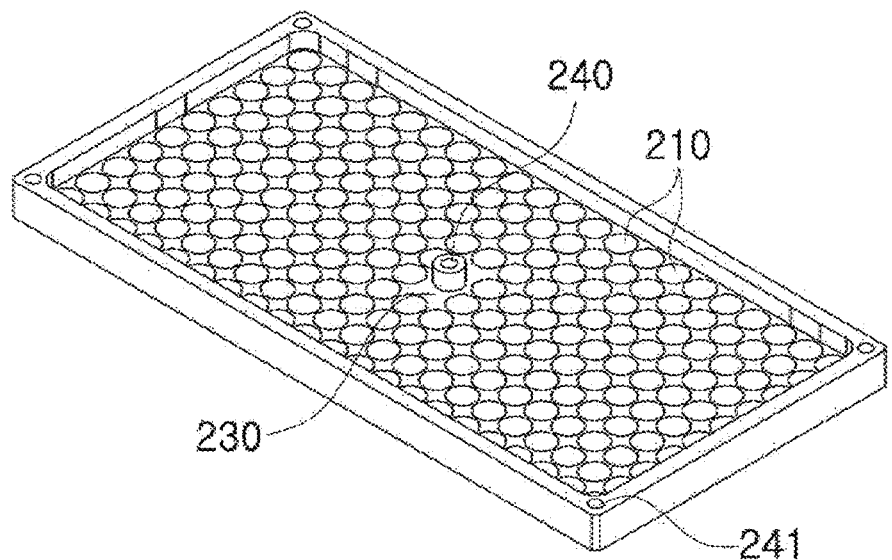
FIG. 6 is a perspective view showing a second mold according to the present invention.

FIG. 6 is a perspective view showing the second mold 200 according to the present invention, and the second mold 200 has a fitting recess 230 concavedly formed on top thereof to correspond to the first mold 100 and a plurality of second hemispherical accommodation grooves 210 formed on the fitting recess 230 in the form of a lattice. The second accommodation grooves 210 are coupled to the first accommodation grooves 110 to thus provide the plurality of spherical accommodation portions 11. Further, the second mold 200 has a first fastening hole 240 formed at the center thereof and second fastening holes 241 formed on the corners of outer edges of the fitting recess 230 so that the second mold 200 can be fixed to the first mold 100 when it is fittedly coupled to the first mold 100 to provide the freeze-drying mold 10. The fastening holes of the first mold 100 and the second mold 200 are fixedly coupled to each other by means of fastening members such as bolts, nuts, fixing pins, and the like, so that the water-soluble polymer solution filled in the accommodation portions 11 can be stably maintained therein, without leaking to the outside in the freeze-drying process.

Even though not shown, the second mold 200 has a length of 300 mm in the range of about 280 to 320 mm, a width of 150 mm in the range of about 130 to 170 mm, and a height of 16 mm in the range of about 12 to 18 mm, and each second accommodation groove 210 has a radius, that is, a depth of 8 mm in the range of about 6 to 10 mm. Further, the fitting recess 230 has a depth a of 8 mm within a range over the depth of the first accommodation groove 110. Within the ranges, the freeze-drying process is easy, the freeze-drying efficiency is excellent, the freeze-dried materials are easily treated, and the freeze-dried materials with desired shapes are obtained.

Further, the second mold 200 is made of aluminum having a high thermal conductivity, and the entire second mold 200 is subjected to white hard anodizing, while top thereof is being subjected to Teflon coating. Accordingly, the shrinkage rate of the solution in the freeze-drying process is easily controlled to easily make the freeze-dried spherical materials. Further, the made freeze-dried materials are easily separated from the mold to optimize a collection rate thereof, and the freeze-dried materials are constant in pore sizes and distributions, have high strength, and do not have any films on the surfaces thereof.

Figure 7:
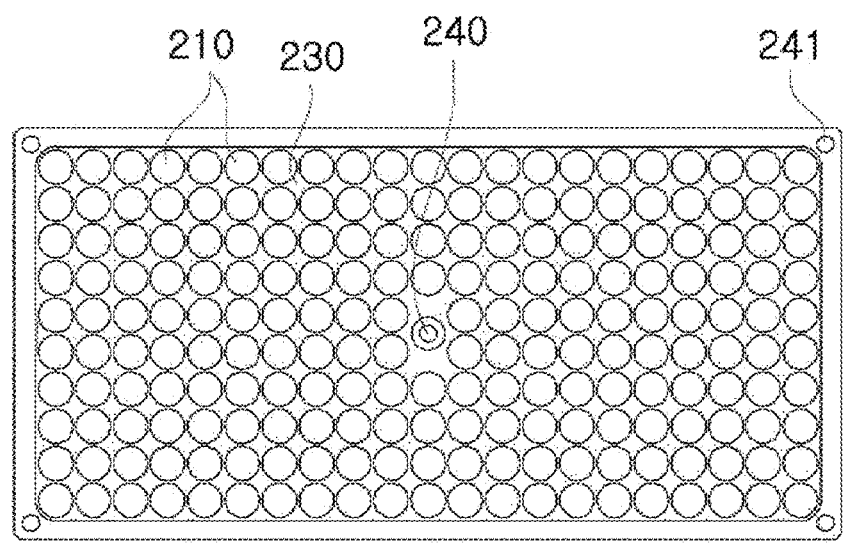
FIG. 7 is a top view showing the second mold according to the present invention.

FIG. 7 is a top view showing the second mold 200 according to the present invention, and the second mold 200 has the fitting recess 230 concavedly formed on top thereof, the plurality of second hemispherical accommodation grooves 210 formed on the fitting recess 230 in the form of the lattice, the first fastening hole 240 formed at the center thereof, and the second fastening holes 241 formed on the corners of outer edges of the fitting recess 230 to fix the freeze-drying mold 10.

Figure 8:
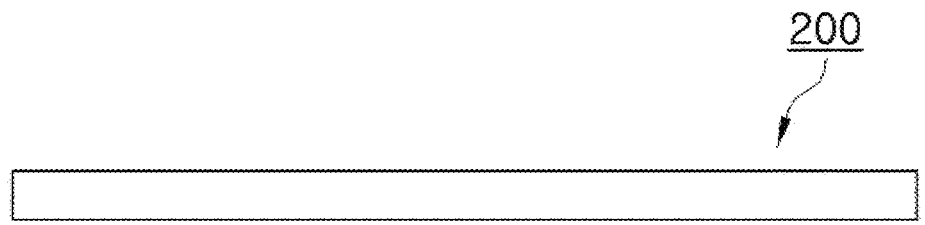
FIG. 8 is a side view showing the second mold according to the present invention.

FIG. 8 is a side view showing the second mold 200 according to the present invention, and the fitting recess 230 on which the second accommodation grooves 210 are formed is steppedly concavedly formed inside the second mold 200, which is not shown on the side of the second mold 200.

Figure 9:
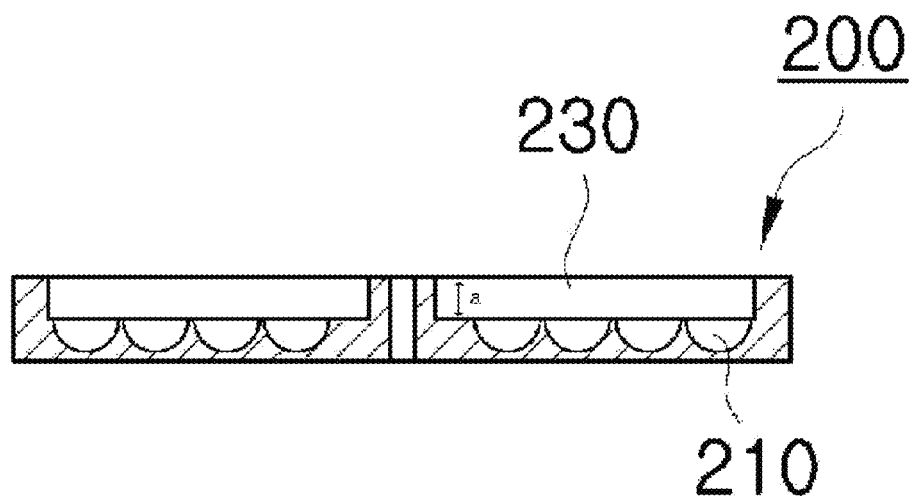
FIG. 9 is a sectional view showing the second mold according to the present invention.

FIG. 9 is a sectional view showing the second mold 200 according to the present invention, and the first fastening hole 240 is formed inside the second mold 200 to fix the second hemispherical accommodation grooves 210 and the freeze-drying mold 10.

Figure 10:
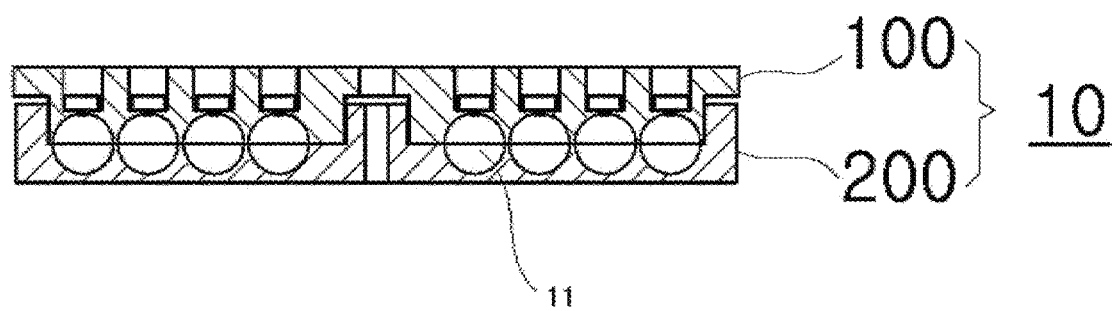
FIG. 10 is a sectional view showing a freeze-drying mold made by fitting the first mold and the second mold to each other according to the present invention.

FIG. 10 is a sectional view showing the freeze-drying mold 10 made by fitting the first mold 100 and the second mold 200 to each other according to the present invention. In specific, the discharge portions 120 are provided to discharge an extra amount of water-soluble polymer solution from the interiors of the accommodation portions 11 or discharge the vaporized water therefrom in the freeze-drying process, and the spherical accommodation portions 11 are formed by coupling the first accommodation grooves and the second accommodation grooves to one another to accommodate the freeze-dried subject solution therein. Further, the fastening holes of the first mold 100 and the second mold 200 are coupled to one another to thus pass through the freeze-drying mold 10.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

EMBODIMENTS

Manufacturing Example 100 parts by weight of hyaluronic acid having the average molecular weight of 10,000 Daltons as low molecular weight hyaluronic acid, 6.5 parts by weight of sodium hyaluronate having the average molecular weight of 220,000 Daltons, 1.5 parts by weight of sodium hyaluronate having the average molecular weight of 1,400,000 Daltons as high molecular weight hyaluronic acid, and 27 parts by weight of a mixture of algin and hydrolyzed collagen (at a weight ratio of 1:3) as a hydrophilic polymer were weighed and put slowly into 1 L of purified water in a reactor in the mentioned order. Next, they were agitated until completely dissolved to thus produce a hyaluronic acid-based solution. In this case, the agitation was carefully conducted at a temperature in the range of 10 to 15° C., while no agitation heat was being generated, for about one hour, and after the dissolved state was checked, the dissolved solution was collected from top, middle, and bottom positions of the reactor, respectively, to measure loss on drying. As a result, completely dissolved states (having the same loss on drying on the top, middle, and bottom positions) were checked.

Example 1, Comparative Examples 1 to 7, and Reference Example 1

The produced hyaluronic acid-based solution was dispensed by predetermined discharge amount into the accommodation grooves formed on a lower plate as the second mold as shown in FIG. 6 and Table 1 as will be suggested below through a dispensing device. In this case, the predetermined discharge amount was in a range of 250 to 350 mL, and according to situations, the predetermined discharge amount of the dispensing device was controlled. Next, the fitting portion formed on an upper plate as the first mold as shown in FIG. 6 and Table 1 was fitted to the fitting recess formed on the lower plate as the second mold as shown in FIG. 6 to thus couple the first mold and the second mold to each other, as shown in FIG. 10, and the fastening holes of the first mold and the second mold were coupled to one another by means of screws to allow the first mold and the second mold to be completely brought into contact with each other. Next, the freeze-drying mold into which the hyaluronic acid-based solution was supplied was inserted into a freeze dryer and then subjected to freeze-drying under freeze-drying conditions mentioned in Table 2 as will be suggested below. However, Reference example 1 did not have any step 10 on the freeze-drying conditions mentioned in Table 2. After the freeze-drying was finished, the mold was removed from the freeze dryer to thus collect freeze-dried spherical hyaluronic acid-based composition balls.

TABLE 1

| Division | Upper plate material | Discharge portion | Upper plate coating | Lower plate material | Lower plate coating |
|---|---|---|---|---|---|
| Example 1 | POM | ○ | X | Aluminum | Hard anodizing + PFA coating |
| Comparative example 1 | | | Silicone mold | | |
| Comparative example 2 | Aluminum | ○ | Hard anodizing + PFA coating | Aluminum | Hard anodizing + PFA coating |
| Comparative example 3 | Aluminum | ○ | X | Aluminum | X |
| Comparative example 4 | POM | ○ | X | POM | X |
| Comparative example 5 | PE | ○ | X | PE | X |
| Comparative example 6 | Aluminum | X | Hard anodizing + PFA coating | Aluminum | X |
| Comparative example 7 | POM | X | X | Aluminum | Hard anodizing + PFA coating |

TABLE 1-continued

| Division | Upper plate material | Discharge portion | Upper plate coating | Lower plate material | Lower plate coating |
|---|---|---|---|---|---|
| Reference example 1 | POM | ○ | X | Aluminum | Hard anodizing + PFA coating |

(wherein POM is polyacetal and PE is polyethylene).

TABLE 2

| | | Freeze-drying conditions | | |
|---|---|---|---|---|
| Division | Temperature | Pressure (μbar) | Time | Remarks |
| Step 1 | −6 | Atmospheric | 0.5 | Kept |
| Step 2 | −6 →−45 | Atmospheric | 7 | Temperature decreasing over 7 hours |
| Step 3 | −45 | Atmospheric | 2 | Kept |
| Step 4 | −10 | 300 | 4 | Kept |
| Step 5 | −5 | 300 | 4 | Kept |
| Step 6 | 0 | 300 | 4 | Kept |
| Step 7 | 10 | 300 | 1 | Kept |
| Step 8 | 20 | 300 | 1 | Kept |
| Step 9 | 30 | 300 | 1 | Kept |
| Step 10 | 40 | 30 | 3 | Kept |

TEST EXAMPLES

The characteristics of the hyaluronic acid-based composition balls collected from Example 1, Comparative examples 1 to 7, and Reference example 1 were measured through methods as will be mentioned below, and the measured results were shown in Table 3 as will be suggested below and FIGS. 11 to 13.

Outer appearance characteristics: The surface characteristics of the hyaluronic acid-based composition balls were checked with the naked eye and photographs (See FIG. 11). In this case, it was estimated that if the hyaluronic acid-based composition balls were separable from the mold to completely spherical shapes, had gentle surfaces, did not have any portions not dried, had high strength, and did not have any films on the surfaces thereof, they are good in quality.

Collection rate: After the outer appearances, sizes, and weights of the freeze-dried balls were checked, the freeze-dried materials satisfying the conditions of a diameter in the range of 10 to 11 mm and a weight greater than or equal to 20 mg were sorted and collected, and next, the ratio of the number of freeze-dried balls collected to the total number of accommodation portions of the mold was checked to calculate the collection rate.

Compressive strength (N): The compressive strength of the freeze-dried balls was measured through a mechanical testing system (with a model name of 3340 series and made by Instron). In specific, the freeze-dried hyaluronic acid-based composition balls were mounted on a jig for testing the compressive strength and then compressed thereagainst at a compressive speed of 2 mm/min up to 50% of the heights thereof, thereby measuring maximum compressive strength N.

Dissolved time (dissolution): Water was sufficiently filled in a given container for submergedly accommodating the hyaluronic acid-based composition balls therein, and next, the hyaluronic acid-based composition balls fell down in the water of the container, thereby measuring the completely dissolved time thereof.

TABLE 3

| | Example | Comparative example | | | | | | | Reference example |
|---|---|---|---|---|---|---|---|---|---|
| Division | 1 | 1 | 2 | 3 | 4 | 5 | 6 | 7 | 1 |
| Outer appearance | Good | Bad Surface shape | Low Strength & Film on Surface | Low Strength & Not separable from mold | Low Strength & Not collected | Low Strength & Not collected | Film on Surface | Over shrinkage & Not separable from mold | Over shrinkage & Partially not dried |
| Collection rate | 95.15% | — | 89.40% | 28.80% | 30.70% | 4.80% | 31.70% | 14.90% | 15.50% |
| Diameter (mm) | 11.01 | 15.70 | 10.82 | 10.23 | 10.55 | 11.33 | 10.54 | 9.42 | 9.76 |
| Compressive strength (Mean, N) | 2.272998 | — | 0.83097 | 0.503496 | 0.803746 | 0.943058 | 0.796794 | 0.787902 | 1.168206 |
| Dissolved time (Sec) | 17.88 | 62.91 | 26.80 | 20.97 | 50.77 | 80.56 | 38.55 | 72.84 | 37.50 |

As appreciated from Table 3, if the hyaluronic acid-based composition balls are made using the freeze-drying mold according to the present invention (Example 1), it can be checked that they have more excellent outer appearance, collection rate, compressive strength, and dissolved time than Comparative examples 1 to 7.

However, if the freeze-drying time, particularly the drying time is greatly reduced (Reference example 1) even under the use of the freeze-drying mold according to the present invention, the hyaluronic acid-based composition balls, which are not partially dried, may be collected, thereby lowering the collection rate thereof.

Figure 11:
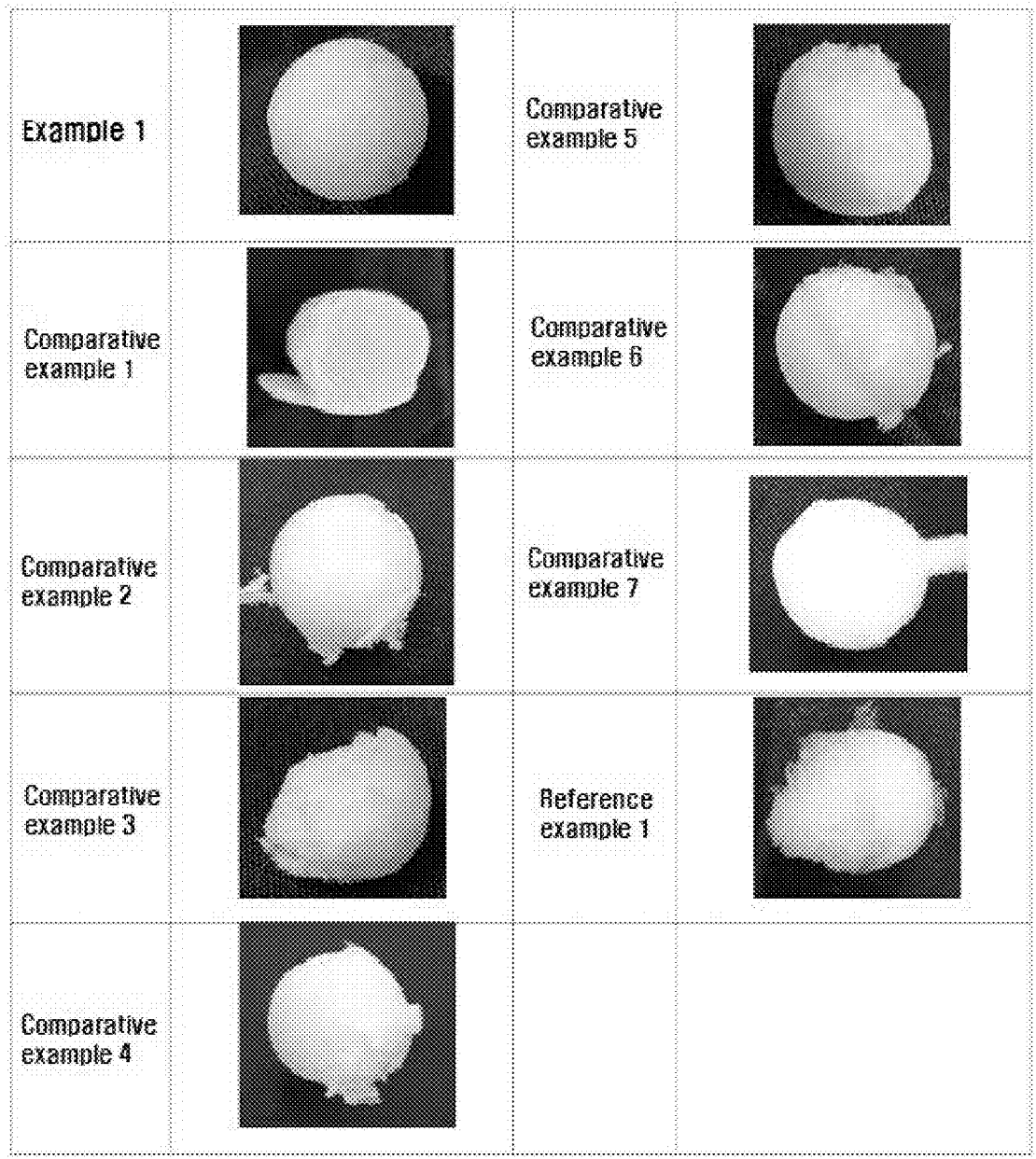
FIG. 11 is an exemplary view showing photographs of hyaluronic acid-based composition balls made in Example 1, Comparative examples 1 to 7, and Reference example 1.

Further, as shown in FIG. 11, the hyaluronic acid-based composition balls produced in Example 1 have clean surfaces and completely spherical shapes, but the hyaluronic acid-based composition balls produced in Comparative examples 1 to 7 do not have any completely spherical shapes at all and are not separated well from the mold.

Figure 12:
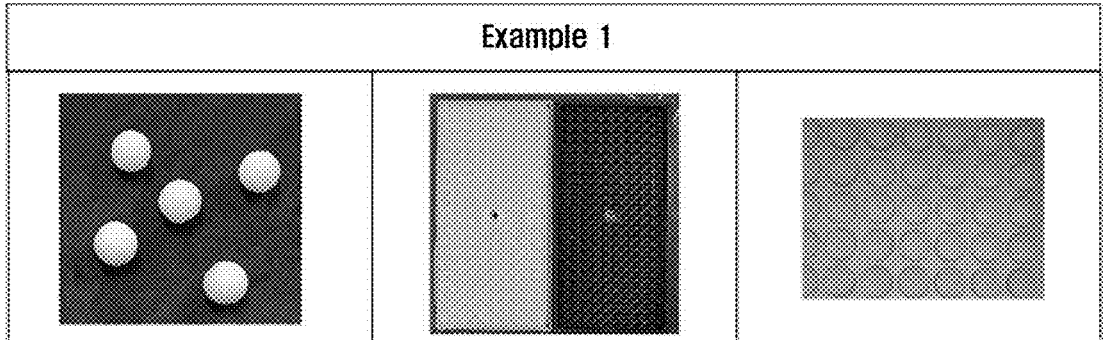
FIGS. 12 and 13 are photographs showing the states of the molds after the hyaluronic acid-based composition balls are removed from the molds after freeze-molding in Example 1, Comparative examples 1 to 7, and Reference example 1, wherein the photographs under the molds show the hyaluronic acid-based composition balls collected from the molds.
Figure 13:
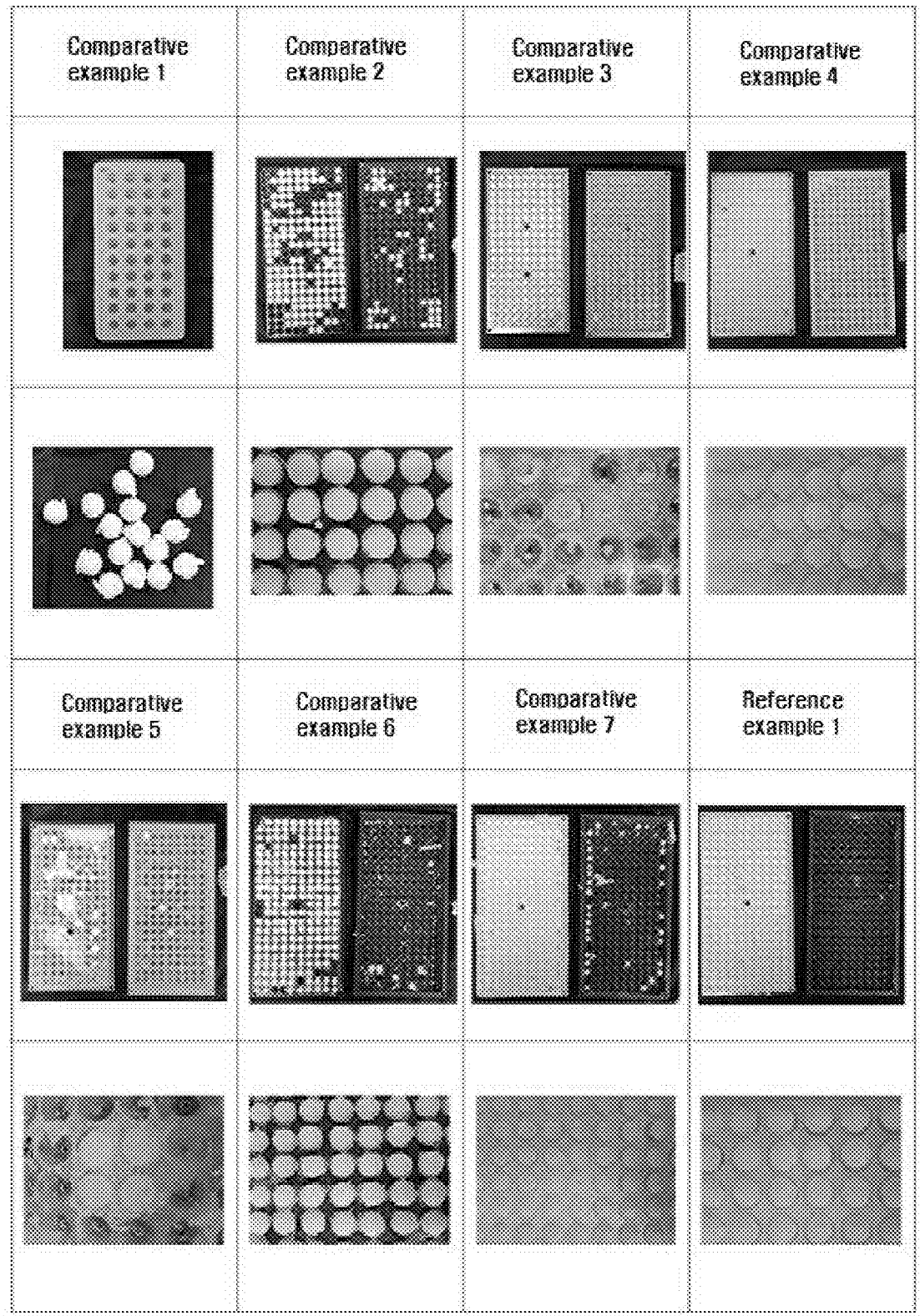

Moreover, as shown in FIGS. 12 and 13, the freeze-drying mold after the freeze-dried hyaluronic acid-based composition balls are collected in Example 1 does not have any remaining materials so that the accommodation portions are clean, but the freeze-drying molds after the freeze-dried hyaluronic acid-based composition balls are collected in Comparative examples 1 to 7 have large amounts of hyaluronic acid-based solution remaining on the accommodation portions of the freeze-drying mold.

EXPLANATIONS OF REFERENCE NUMERALS

10: Freeze-drying mold 100: First mold
110: First accommodation groove
120: Discharge portion
130: Fitting portion 140: Fastening hole
141: Fastening hole 200: Second mold
210: Second accommodation groove 230: Fitting recess
240: Fastening hole 241: Fastening hole
11: Accommodation portion

The invention claimed is:

1. A method for manufacturing a hyaluronic acid-based water-soluble polymer balls using a freeze-drying mold for a water-soluble polymer and hyaluronic acid-based water-soluble polymer solution,
wherein the freeze-drying mold for a water-soluble polymer has a first mold and a second mold,
wherein the first mold has a fitting portion steppedly protruding from the underside thereof, a plurality of first hemispherical accommodation grooves formed on the surface of the fitting portion in the form of a lattice, and a plurality of discharge portions formed on top thereof to communicate with the plurality of first accommodation grooves;
wherein the second mold has a fitting recess concavedly formed on top thereof to be coupled to the fitting portion and a plurality of second hemispherical accommodation grooves formed on top thereof in the form of a lattice to be facingly coupled to the plurality of first accommodation grooves of the first mold to thus provide a plurality of spherical accommodation portions;
wherein the first mold and the second mold have at least one or more fastening holes formed thereon correspondingly to one another and thus coupled to one another by means of fastening members,
wherein the first mold has a lower thermal conductivity than the second mold,
wherein the second mold includes a coating layer using the same material as the first mold, and
wherein the method for manufacturing the hyaluronic acid-based water-soluble polymer balls comprises steps of:
coupling the first mold having the plurality of first hemispherical accommodation grooves formed on the underside thereof and the plurality of discharge portions formed on top thereof to communicate with the plurality of first hemispherical accommodation grooves to the second mold having the plurality of second accommodation grooves formed on top thereof to be facingly coupled to the plurality of first hemispherical accommodation grooves to thus provide the plurality of spherical accommodation portions;
heating and agitating the hyaluronic acid-based water-soluble polymer solution at a temperature in the range of 5 to 50° C.;
a first freezing step of freezing the hyaluronic acid-based water-soluble polymer solution at an atmospheric pressure and a temperature in the range of −3 to −8° C. for 20 to 40 minutes;
a second freezing step of reducing the hyaluronic acid-based water-soluble polymer solution after the first freezing step to a temperature in the range of −40 to −50° C. at the atmospheric pressure for 5 to 9 hours;
and a third freezing step of keeping the hyaluronic acid-based water-soluble polymer solution after the second freezing step to a temperature in the range of −40 to −50° C. at the atmospheric pressure for 1 to 3 hours;
a first drying step of step by step or sequentially raising the frozen hyaluronic acid-based water-soluble polymer solution at a pressure in the range of 100 to 1,000 pbar to a temperature in the range of 10 to 40° C. for 5 to 30 hours; and a second drying step of drying the water-soluble polymer solution after the first drying step at a pressure in the range of 1 to 99 pbar and a temperature in the range of 20 to 50° C. for 1 to 20 hours;
and separating the first mold and the second mold from each other to collect the hyaluronic acid-based water-soluble polymer balls having a dissolving time in water within 20 seconds.

2. The method according to claim 1, wherein the hyaluronic acid-based water-soluble polymer solution comprising A) 44 to 93% by weight of hyaluronic acid or hyaluronic acid salt having the average molecular weight less than 100,000 Daltons, B-1) 0.5 to 12% by weight of hyaluronic acid or hyaluronic acid salt having the average molecular weight in the range of 100,000 to 1,000,000 Daltons, B-2) 0.1 to 5% by weight of hyaluronic acid or hyaluronic acid salt having the average molecular weight greater than 1,000,000 Daltons.

3. The method according to claim 1, wherein the hyaluronic acid-based water-soluble polymer solution comprises: 100 parts by weight of a base polymer comprising A) 44 to 93% by weight of hyaluronic acid or hyaluronic acid salt having the average molecular weight less than 100,000 Daltons, B-1) 0.5 to 12% by weight of hyaluronic acid or hyaluronic acid salt having the average molecular weight in the range of 100,000 to 1,000,000 Daltons, B-2) 0.1 to 5% by weight of hyaluronic acid or hyaluronic acid salt having the average molecular weight greater than 1,000,000 Daltons, and C) 1 to 50% by weight of a hydrophilic polymer; and 0 to 25 parts by weight of active ingredients.

4. The method according to claim 3, wherein the hyaluronic acid salt comprising one or more materials selected from the group consisting of sodium hyaluronate, potassium hyaluronate, calcium hyaluronate, magnesium hyaluronate, zinc hyaluronate, cobalt hyaluronate, and tetrabutylammonium hyaluronate, the hydrophilic polymer comprising one or more materials selected from the group consisting of maltodextrin, dextrin, guar gum, xanthan gum, Arabic cum, carboxymethylcellulose, agar, beta-glucan, pullulan, collagen, algin, cross-linked hyaluronic acid salt, cross-linked hyaluronic acid, chitosan, heparin, gelatin, elastin, hydrolyzed elastin, fibrin, laminin, fibronectin, proteoglycan, heparin sulfate, chondroitin sulfate, dematan sulfate, and keratan sulfate, and the active ingredients comprising one or more materials selected from the group consisting of cetearyl olivate, ethylhexyl olivate, hydroxypropyltrimonium hyaluronic acid, sodium caprooyl hyaluronate, sodium oleoyl hyaluronate, sodium acetylated hyaluronate, arbutin, *broussonetia* extract, Licorice extract, *Euphorbiae lathyridis* seed extract, *Atractylodes macrocephala* extract, ethyl ascorbyl ether, ascorbyl glucoside, niacinamide, magnesium ascorbyl phosphate, ascorbic acid and a derivative thereof, kojic acid, glutathione, tyrosinase, diosmetin, macelignan, vitamins and derivatives thereof, asiaticoside, ubidecarenone, Peony extract, polyethoxylated retinamide, hydroxyproline, retinoic acid and a derivative thereof, alpha hydroxyl acid (AHA), adenosine, botox and a derivative thereof, and an extract of rosemary, cloves, *Thujae orientalis* semen, *Curcuma longa* root, green tea, black soybean seed coat, rose leaves, *Paeonia lactiflora* pallas, *Platycodon grandiflours*, bean sprouts, colored barley seed coat, *Camellia* leaves, buckwheat, grapefruit, licorice, *Coptis chinensis, Phellodendron* bark, Bikal skullcap, cinnamon, grass, *Rubus coreanus* miquel, *Galla rhois, Juniperus chinensis*, Forsythia, chili leaves, mint, mock strawberry, *Morus alba, Saururus chinensis*, pine tree, wormwood, *Houttuynia cordata, Prunus yedoensis Matsumura, Sasa borealis Makin*, or *Phyllostachys bambusoides* stem, and wherein the active ingredients comprise in an amount of 0.1 to 25 parts by weight per 100 parts by weight of the base polymer.

\* \* \* \* \*